(12) United States Patent
Fletcher

(10) Patent No.: US 8,972,901 B2
(45) Date of Patent: *Mar. 3, 2015

(54) FAST CURSOR LOCATION

(71) Applicant: International Business Machines Corporation, Armonk, NY (US)

(72) Inventor: Benjamin J. Fletcher, Huddersfield (GB)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/862,457

(22) Filed: Apr. 14, 2013

(65) Prior Publication Data

US 2013/0239067 A1   Sep. 12, 2013

Related U.S. Application Data

(63) Continuation of application No. 13/345,802, filed on Jan. 9, 2012.

(51) Int. Cl.
*G06F 3/048* (2013.01)
*G06F 3/0481* (2013.01)

(52) U.S. Cl.
CPC .................................. *G06F 3/04812* (2013.01)
USPC ............ 715/856; 715/711; 715/857; 715/858

(58) Field of Classification Search
USPC ......... 715/856, 857, 858, 859, 860, 861, 862, 715/863, 711
See application file for complete search history.

(56) References Cited

U.S. PATENT DOCUMENTS

| 3,739,347 | A | 6/1973 | Forsberg |
| 4,190,834 | A | 2/1980 | Doornink |
| 7,499,027 | B2 | 3/2009 | Brigham, II et al. |
| 7,647,565 | B2 | 1/2010 | Hayes, Jr. et al. |
| 2004/0233164 | A1 | 11/2004 | Marion et al. |
| 2005/0088410 | A1 | 4/2005 | Chaudri |
| 2006/0008779 | A1* | 1/2006 | Shand et al. .................... 434/90 |
| 2006/0248462 | A1 | 11/2006 | Ofek et al. |
| 2008/0074389 | A1 | 3/2008 | Beale |
| 2008/0222554 | A1* | 9/2008 | Chaudhri et al. ............. 715/781 |
| 2009/0122009 | A1 | 5/2009 | Kuezner |
| 2010/0199213 | A1* | 8/2010 | Suzuki .......................... 715/784 |

* cited by examiner

*Primary Examiner* — Doon Chow
*Assistant Examiner* — Tam Tran
(74) *Attorney, Agent, or Firm* — Steven M. Greenberg, Esq.; CRGO Law

(57) ABSTRACT

Embodiments of the present invention provide a method, system and computer program product for fast mouse pointer location. In an embodiment of the invention, a method for fast mouse pointer location includes determining a contemporaneous location of a mouse pointer in a GUI of a host computer, dimensioning in memory of the host computer different shapes and arranging the shapes to proximately meet at a point of intersection, overlaying the shapes in the GUI at a position proximate to the contemporaneous location of the mouse pointer, displaying the shapes in the GUI for a brief period of time before hiding the shapes from view in the GUI and repeating the determining, dimensioning, overlaying and displaying for different movements of the mouse pointer in the GUI.

5 Claims, 1 Drawing Sheet

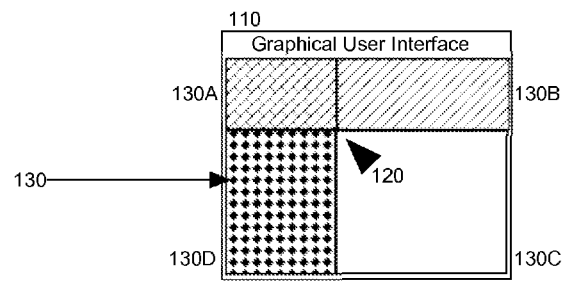
FIG. 1
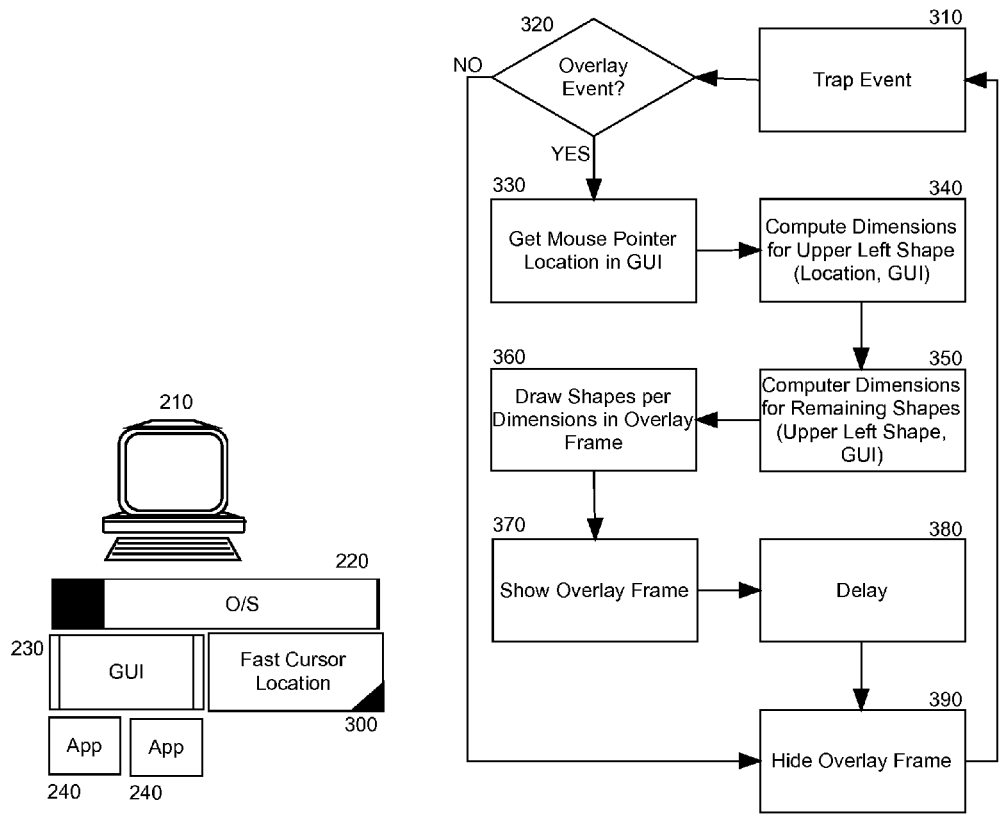
FIG. 2  FIG. 3

FAST CURSOR LOCATION

CROSS-REFERENCE TO RELATED APPLICATIONS

This application claims priority to U.S. patent application Ser. No. 13/345,802, currently pending, filed Jan. 9, 2012, the entirety of which is incorporated herein by reference.

BACKGROUND OF THE INVENTION

1. Field of the Invention

The present invention relates to mouse cursor display in a graphical user interface (GUI) and more particularly to mouse cursor location in a GUI.

2. Description of the Related Art

In computing, a cursor is an indicator used to show the position on a computer monitor or other display device that will respond to input from a text input or pointing device. A text cursor blinking on a periodic interval traditionally has been referred to as a "caret". By comparison, the mouse cursor has been referred to as a "mouse pointer", owing to the traditional arrow shape of the mouse cursor. Interfaces driven by a computer mouse or other pointing device use the mouse pointer to show a contemporaneous position on a GUI driven by the pointing device. On modern systems the default mouse cursor is an arrow pointing up and to the left, though mouse cursors take on literally an infinite number of shapes, often customized by the end user.

In many a GUI, the mouse pointer changes shape depending upon the circumstance, such as to indicate processing by the computer, or the prohibition of an action at a contemporaneous position on the GUI. Thus, the mouse pointer can provide critical information as to the status of computing in a computing system. The utility of the mouse pointer, however, is not without its challenge. In particular, as the mouse pointer traditionally is a smallish graphical icon relative to the size of a GUI, locating the mouse pointer in a GUI even for the strongest of eyes can be problematic.

To address the difficulty in visually locating a mouse pointer in a GUI, pointer trails have been provided. A pointer trail is a long-standing feature of the GUI provided to enhance the visibility of the mouse pointer by leaving for a transient period of time an image of the mouse pointer at a past position so as to simulate a "trail" of mouse pointers as an aid to visually locating the mouse pointer in the GUI. Although disabled by default in many operating systems, mouse pointer trails have been provided as a feature mainly for users with poor vision and for screens where low visibility may become an issue, such as flat panel displays in bright sunlight.

The problem of locating a mouse pointer in a GUI can be compounded when using a GUI as a visual display for a presentation or demonstration of a computing system where tracking the movements of the mouse pointer can be critical to understanding the demonstration. In a screencast—a term of art relating to the digital recording of computer screen output—often, due to the low resolution/frame rate of the video, it is not easy to see where the mouse pointer presently is located, and what movement in which the mouse pointer engages. Further, in a live demonstration presented in a GUI, often the audience stands behind the computer operator, and sometimes it is not easy to see what mouse movements transpire on the screen at a distance. This is also true in respect to presentations with audiences. Most recently, the problem of tracking mouse pointer movements has become prevalent with the playback of screencasts on mobile devices with small screens.

BRIEF SUMMARY OF THE INVENTION

Embodiments of the present invention address deficiencies of the art in respect to mouse pointer location and provide a novel and non-obvious method, system and computer program product for fast mouse pointer location. In an embodiment of the invention, a method for fast mouse pointer location includes determining a contemporaneous location of a mouse pointer in a GUI of a host computer, dimensioning in memory of the host computer different shapes and arranging the shapes to proximately meet at a point of intersection, overlaying the shapes in the GUI at a position proximate to the contemporaneous location of the mouse pointer, displaying the shapes in the GUI for a brief period of time before hiding the shapes from view in the GUI and repeating the determining, dimensioning, overlaying and displaying for different movements of the mouse pointer in the GUI.

In another embodiment of the invention, a computer data processing system is provided. The system includes a host computer with at least one processor and memory, an operating system executing in the host computer, a GUI provided by the operating system for different applications hosted by the operating system and a fast cursor location module coupled to the GUI. The module includes program code that when executed in the host computer, determines a contemporaneous location of a mouse pointer in the GUI, dimensions in the memory of the host computer a plurality of shapes and arranges the shapes to proximately meet at a point of intersection, overlays the shapes in the GUI at a position proximate to the contemporaneous location of the mouse pointer, displays the shapes in the GUI for a brief period of time before hiding the shapes from view in the GUI and repeats the determining, dimensioning, overlaying and displaying for different movements of the mouse pointer in the GUI.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a GUI configured with a transient overlay for fast mouse pointer location;

FIG. 2 is a schematic illustration of a computer data processing system configured for fast mouse pointer location using transient overlays; and, FIG. 3 is a flow chart illustrating a process for fast mouse pointer location using transient overlays.

DETAILED DESCRIPTION OF THE INVENTION

Embodiments of the invention provide for fast mouse pointer location using transient overlays. In an embodiment of the invention, a movement of a mouse pointing device can be detected and in response thereto, a current location of a corresponding mouse pointer in a GUI can be determined. An hidden window acting as an overlay to the GUI can be dimensioned according to a portion of the GUI and the overlay can be subdivided into a set of shapes such that the set of shapes proximately intersect at a point of intersection that is proximate to the current location of the corresponding mouse pointer. Thereafter, the overlay can be rendered visible over the GUI for a transient period of time. Subsequently, the overlay can be hidden until a next movement of the mouse pointer is detected. In this way, as the mouse pointer moves about the GUI the overlay can provide a visual queue to a viewer of the GUI as to the contemporaneous location of the mouse pointer.

In further illustration, FIG. 1 pictorially shows a GUI configured with a transient overlay for fast mouse pointer location. As shown in FIG. 1, a GUI 110 can provide a screen display in which a mouse pointer 120 can be moved about. In response to detecting movement of the mouse pointer 120, an overlay 130 can be constructed of different shapes 130A, 130B, 130C, 130D proximately intersecting at a point of intersection near a contemporaneous position of the mouse pointer 120. In one aspect of the embodiment, the shapes 130A, 130B, 130C, 130D can be dimensioned to fill the GUI 110, yet can be distinguishable from one another, for example by a pronounced border about each of the shapes 130A, 130B, 130C, 130D as shown in FIG. 1. The overlay 130 can then be rendered visible for only a brief period of time before being rendered hidden. Subsequently, upon detecting an additional movement of the mouse pointer 120 to a new position, the overlay 130 again can be constructed of the different shapes 130A, 130B, 130C, 130D proximately intersecting at a point of intersection near the new position of the mouse pointer 120.

Optionally, the different shapes 130A, 130B, 130C, 130D can be constructed using different visual characteristics to visually distinguish the shapes 130A, 130B, 130C, 130D. For example, the shape 130A positioned to the upper-left of the mouse pointer 120 can be shaded or colored in a manner visually distinctive from the other shapes 130B, 130C, 130D so as to further indicate to a viewer the contemporaneous position of the mouse pointer 120. Additionally, the border style and color of each of the shapes 130A, 130B, 130C, 130D can be varied to achieve the same effect.

The process described in connection with FIG. 1 can be implemented within a computer data processing system. To that end, FIG. 2 is a schematic illustration of a computer data processing system configured for fast mouse pointer location using transient overlays. The system can include a host computer 210 with at least one processor and memory supporting the operation of an operating system 220. The operating system 220 in turn can provide computer program logic for rendering a GUI 230 to access the features of the operating system 220, and also to permit the construction, display and management of display windows for different applications 240 executing in the memory of the host computer 210.

A fast cursor location module 300 can be coupled to the GUI 230. The module 300 can include program code that when executed in the memory of the host computer 210, can respond to a mouse movement event by ascertaining a contemporaneous location of corresponding mouse pointer in the GUI 230 and by constructing a non-overlapping arrangement of shapes, such as rectangles, in a hidden window such that the shapes meet a point of intersection proximate to the contemporaneous location of the mouse pointer in the GUI 230. Thereafter, the program code of the module 300 can render the hidden window visible over the GUI 230 for a limited period of time subsequent to which the hidden window can be rendered hidden. In this way, the visual cue of the shapes can indicate to a viewer the contemporaneous location of the corresponding mouse pointer in the GUI 230.

In yet further illustration of the operation of the fast cursor location module 300, FIG. 3 is a flow chart illustrating a process for fast mouse pointer location using transient overlays. Beginning in block 310, an event can be trapped in an event handler and in block 320, the trapped event can be inspected to determine whether or not the mouse pointer is moving within the GUI or alternatively whether or not a request to display an overlay has been directed. If so, in block 330 the contemporaneous location of the mouse pointer can be determined and in block 340, dimensions can be computed for a shape for positioning to the upper left of the contemporaneous location of the mouse pointer, but within the boundary of the GUI. In block 350, dimensions for additional shapes can be computed accounting for the dimensions of the shape to the upper left of the contemporaneous location of the mouse pointer, the dimensions of the GUI and the contemporaneous location of the mouse pointer.

In block 360, the shapes can be drawn according to the computed dimensions in a hidden window. Subsequently, in block 370 the hidden window acting as an overlay can be rendered visible over the GUI. In block 380 a delay can be incurred after which in block 390 the overlay can be hidden once again. Afterwards, in block 310 a next event can be trapped and processed and, to the extent in decision block 320 it is determined that the event is a mouse movement event or a request to display the overlay, once again in blocks 330 through block 390, the overlay can be constructed with dimensioned shapes and displayed for a brief moment so as to indicate a contemporaneous location of the mouse pointer in the GUI.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows.

I claim:

1. A fast mouse pointer location method comprising:
   determining a contemporaneous location of a mouse pointer in a graphical user interface (GUI) of a host computer;
   dimensioning in memory of the host computer a plurality of different shapes, the shapes being rectangles, each of the shapes being separately defined in memory of the host computer, and separately arranging each of the different shapes in the GUI to proximately meet at a point of intersection, each of the plurality of different shapes having a visual characteristic to visually distinguish from any other one of the plurality of different shapes;
   overlaying the shapes in the GUI so that the point of intersection is proximate to the contemporaneous location of the mouse pointer;
   displaying the shapes in the GUI for a brief period of time before hiding the shapes from view in the GUI; and, repeating the determining, dimensioning, overlaying and displaying for different movements of the mouse pointer in the GUI.

2. The method of claim 1, wherein the position proximate to the contemporaneous location of the mouse pointer is a position upper left of the contemporaneous location of the mouse pointer.

3. The method of claim 1, wherein individual ones of the shapes are of different colors.

4. The method of claim 1, wherein individual ones of the shapes are of different fill patterns.

5. The method of claim 1, wherein the shapes are dimensioned to fill the GUI.

\* \* \* \* \*